(12) United States Patent
Maxwell et al.

(10) Patent No.: US 7,413,163 B2
(45) Date of Patent: Aug. 19, 2008

(54) RACK AND PINION WHEEL DRIVE FOR AN INDUSTRIAL SLIDING BLADE DAMPER

(75) Inventors: Ronald K. Maxwell, Irving, TX (US); David F. McGrath, New Braunfels, TX (US); Gregory Allyn Perkins, Bulverde, TX (US)

(73) Assignee: Senior Investments AG, Schaffhausen (CH)

( * ) Notice: Subject to any disclaimer, the term of this patent is extended or adjusted under 35 U.S.C. 154(b) by 0 days.

(21) Appl. No.: 10/709,377

(22) Filed: Apr. 30, 2004

(65) Prior Publication Data
US 2005/0242316 A1 Nov. 3, 2005

(51) Int. Cl.
F16K 31/44 (2006.01)
F16K 3/00 (2006.01)
F16H 1/04 (2006.01)

(52) U.S. Cl. .................. 251/250; 251/326; 454/334; 74/422

(58) Field of Classification Search .............. 251/248, 251/250, 326, 327, 328; 454/334; 74/422
See application file for complete search history.

(56) References Cited

U.S. PATENT DOCUMENTS

| | | | | |
|---|---|---|---|---|
| 10,720 A * | 4/1854 | Andrews | ............... | 74/422 |
| 558,868 A * | 4/1896 | Wellman | ............... | 74/422 |
| 1,159,486 A * | 11/1915 | Froelich | ............... | 74/465 |
| 1,178,456 A * | 4/1916 | Pocock | ............... | 74/422 |
| 1,223,754 A * | 4/1917 | Berles | ............... | 74/422 |
| 1,289,508 A * | 12/1918 | Melcher | ............... | 74/465 |
| 1,381,938 A * | 6/1921 | Sheafor | ............... | 137/584 |
| 1,476,344 A * | 12/1923 | McGee et al. | ............... | 138/94.3 |
| 1,483,041 A * | 2/1924 | Brooks | ............... | 251/250 |
| 1,868,694 A * | 7/1932 | Coghlan | ............... | 251/250 |
| 2,240,049 A * | 4/1941 | Murphy | ............... | 405/106 |
| 2,509,161 A * | 5/1950 | Meyers | ............... | 74/422 |
| 3,145,969 A * | 8/1964 | Von Zweck | ............... | 251/172 |
| 3,367,625 A * | 2/1968 | Fortune | ............... | 251/172 |
| 3,371,493 A * | 3/1968 | Woolley | ............... | 405/106 |
| 4,022,241 A * | 5/1977 | Fox | ............... | 137/240 |
| 4,163,458 A * | 8/1979 | Bachmann | ............... | 137/240 |
| 4,176,673 A * | 12/1979 | Connor | ............... | 137/240 |
| 4,235,256 A * | 11/1980 | Crawshay | ............... | 137/240 |
| 4,292,992 A * | 10/1981 | Bhide' | ............... | 137/340 |
| 4,327,893 A * | 5/1982 | Bachmann et al. | ............... | 251/159 |
| 4,531,472 A * | 7/1985 | Marrero et al. | ............... | 116/28 R |
| 4,561,472 A * | 12/1985 | Dreyer et al. | ............... | 138/94.3 |
| 5,330,720 A | 7/1994 | Sorbo et al. | | |
| 5,494,257 A * | 2/1996 | Maxwell | ............... | 251/307 |

(Continued)

FOREIGN PATENT DOCUMENTS

CH 682416 A5 5/1990

(Continued)

*Primary Examiner*—Stephen M. Hepperle
*Assistant Examiner*—Andrew J Rost
(74) *Attorney, Agent, or Firm*—Greenberg Traurig LLP

(57) ABSTRACT

This invention discloses improvements to a damper of the type used in industrial applications to open and close ducts carrying noxious or corrosive materials, such as combustion by-products. The improvements include a linear rack and wheeled pinion system to raise and lower a damper blade plate and improvements to the seal cartridge to prolong the life of the seal membrane and to prevent galling between the blade plate and the seal cartridge or damper frame.

20 Claims, 14 Drawing Sheets

U.S. PATENT DOCUMENTS

| | | | |
|---|---|---|---|
| 6,023,989 A * | 2/2000 | Imase et al. | 74/422 |
| 6,123,319 A * | 9/2000 | Maxwell | 251/307 |
| 6,311,800 B1 * | 11/2001 | St-Germain et al. | 74/465 |

FOREIGN PATENT DOCUMENTS

| | | |
|---|---|---|
| DE | 32 46 227 A1 | 12/1982 |
| EP | 0 240 620 A1 | 10/1987 |
| GB | 2 226 417 A | 6/1990 |
| WO | WO 01/44773 A2 | 6/2001 |
| WO | WO 02/088656 A1 | 11/2002 |

* cited by examiner

RACK AND PINION WHEEL DRIVE FOR AN INDUSTRIAL SLIDING BLADE DAMPER

FIELD OF THE INVENTION

This invention relates to industrial dampers of the type used in flue gas ducting systems and, in particular, provides improvements to the type of damper utilizing a sliding blade mechanism and inflatable seal.

BACKGROUND OF INVENTION

The devices of the type disclosed herein are used principally in industrial settings having exhaust duct systems with large cross sectional dimensions wherein exhaust gases must be processed by scrubbers and/or precipitators before they can be released to the air through a smokestack. An example of use for the damper of the present system would be in a power plant where combustion by-products must be released. Such combustion by-products may contain sulfur dioxide, carbon monoxide, carbon dioxide and other noxious and corrosive compounds. In addition to corrosive compounds present in the exhaust gases, temperatures within the ducts may reach highs in the range of 300° to 700° F.

It is desirable in such settings that the flow of combustion by-products through individual ducts be interrupted at various times for the purpose of performing maintenance on the scrubbers and precipitators within the exhaust system. Therefore, a typical application of the damper of the present invention would be within a duct in an exhaust system from an industrial plant to isolate a scrubber and/or a precipitator from the normal flow of combustion by-products. Because the ducts carrying the combustion by-products may be relatively large, for example, on the order of twenty-five to four hundred square feet in cross sectional area, it is possible that maintenance workers may be required to physically enter the duct to perform maintenance operations. It is therefore necessary that a seal be provided such that combustion by-products do not leak past the damper and into the area where maintenance workers may be present.

Typical prior art dampers of the type for which improvements are shown by this invention consist of a frame which is secured inline in a duct carrying combustion by-products. A blade typically slides into the cross sectional area of the duct from an area outside of the duct to close the duct, thereby interrupting the flow of the combustion by-products past the damper. In addition, to better seal the duct against leaks of the combustion by-products past the damper blade, a seal within the damper contacts the blade and is forced against the blade by an inflation pressure provided by compressed air which may be inserted into a hollow area of the seal. To open the damper it is known in the art to evacuate the air from within the seal to cause the seal to collapse away from the blade, thereby allowing the blade to be retracted to open the duct.

Such a damper is shown in U.S. Pat. No. 4,561,472 (Dryer et al.). The damper of the '472 patent is typical of those shown in the many patents of the prior art and improvements thereto are disclosed by this invention. Other similar dampers are also shown in U.S. Pat. No. 4,235,256 (Crawshay), U.S. Pat. No. 4,163,458 (Bachmann) and U.S. Pat. No. 4,022,241 (Fox).

One problem with the damper disclosed by Dryer et al. is that a failure of the seal may be precipitated by a failure of the compressed air system, which may allow the seal to deflate, thereby allowing combustion by-products to leak around the blade. A further problem with the prior art dampers of the type disclosed by Dryer et al. is that the blade, which may be subjected to differential pressure gradients and be relatively heavy, on the order of 4 plus tons, may contact the seal cartridge frame during retraction and engagement, causing galling to develop between the blade and the seal cartridge frame. This is particularly troublesome in corrosive environments where alloy materials must be utilized. Further, the mechanism for raising and lowering the blade in the prior art systems is prone to fouling by the collection of dust and dirt and through corrosion of the mechanism by continued exposure to the corrosive elements present in the combustion by-products. Lastly, the flexible seals of the prior art are typically permanently affixed to the frame of the damper, making it difficult to repair or replace the seal when necessary. These and other problems with the prior art are addressed by the current invention.

SUMMARY OF INVENTION

The device of the present invention is an improved damper of the type shown in the prior art and consists primarily of a frame which is provided with mounting flanges with holes sized for fasteners to attach to adjacent ductwork flanges. The invention includes a removable seal cartridge installed within and parallel to the frame. The seal cartridge inserts into the frame as a single unit, and may be removed and inserted through a lower access cover or a removable bonnet panel. A gasket may be attached to the seal cartridge and placed between it and the frame.

A bonnet is attached to the frame and is disposed directly above the frame, but outside of the cross sectional area of the duct. When the damper is in the open position, a blade plate is stored in the bonnet. When the damper is in the closed position, the blade plate translates into the area of the frame inside the duct with a motion which is essentially parallel to the frame. The bonnet provides an integrated area in which to store the blade plate when the damper is open and eliminates the need for seals between the lower frame section of the damper and the upper blade storage section of the damper.

In one improvement over the prior art, the opposing edges of the blade parallel to the direction of movement are formed into a rack system consisting of a toothed edge. The toothed edges of the blade plate engage with specially designed pinion wheels to impart a linear force to the blade plate thereby causing it to translate into and out of the area within the frame to open and close the damper, depending upon the direction of rotation of the pinion wheels. The invention employs circular pinions fabricated of pinion wheel sides fixated with a plurality of pinion pins. The pinion wheel sides also act as a guide for the blade plate as it translates into and out of the duct. The blade plate edges are each cut as a linear rack of a shape and dimension such that any thermal expansion of the blade is accommodated. The engagement of the pinion wheels with the blade is self-cleaning and virtually maintenance free. The use of pinion pins is an improvement over pinion gears in that solid matter and effects of corrosion do not deteriorate performance of the drive over time.

Compressed air is injected into or evacuated from the seal cartridge to operate the seal. The seal, when in the inflated position, engages the blade plate to form an air-tight barrier. When the air is evacuated from the seal cartridge, the seal collapses due to negative air pressure and the blade plate may be retracted into the bonnet. The seal cartridge is fitted with an air fitting for injection of compressed air into the seal cartridge and for evacuation of air from the seal cartridge. In another improvement over the prior art, the seal membrane of the present invention is able to maintain contact with the blade plate even in the event of a failure of the compressed air system, thereby providing a failsafe seal.

The seal cartridge is fitted with a blade guide composed of a hardened metal along which the blade plate rides as it translates into and out of the damper. The hardened metal blade guide prevents the cold welding or galling between the heavy blade plate and the seal cartridge which was a problem with prior art designs.

DETAILED DESCRIPTION

Figure 1:
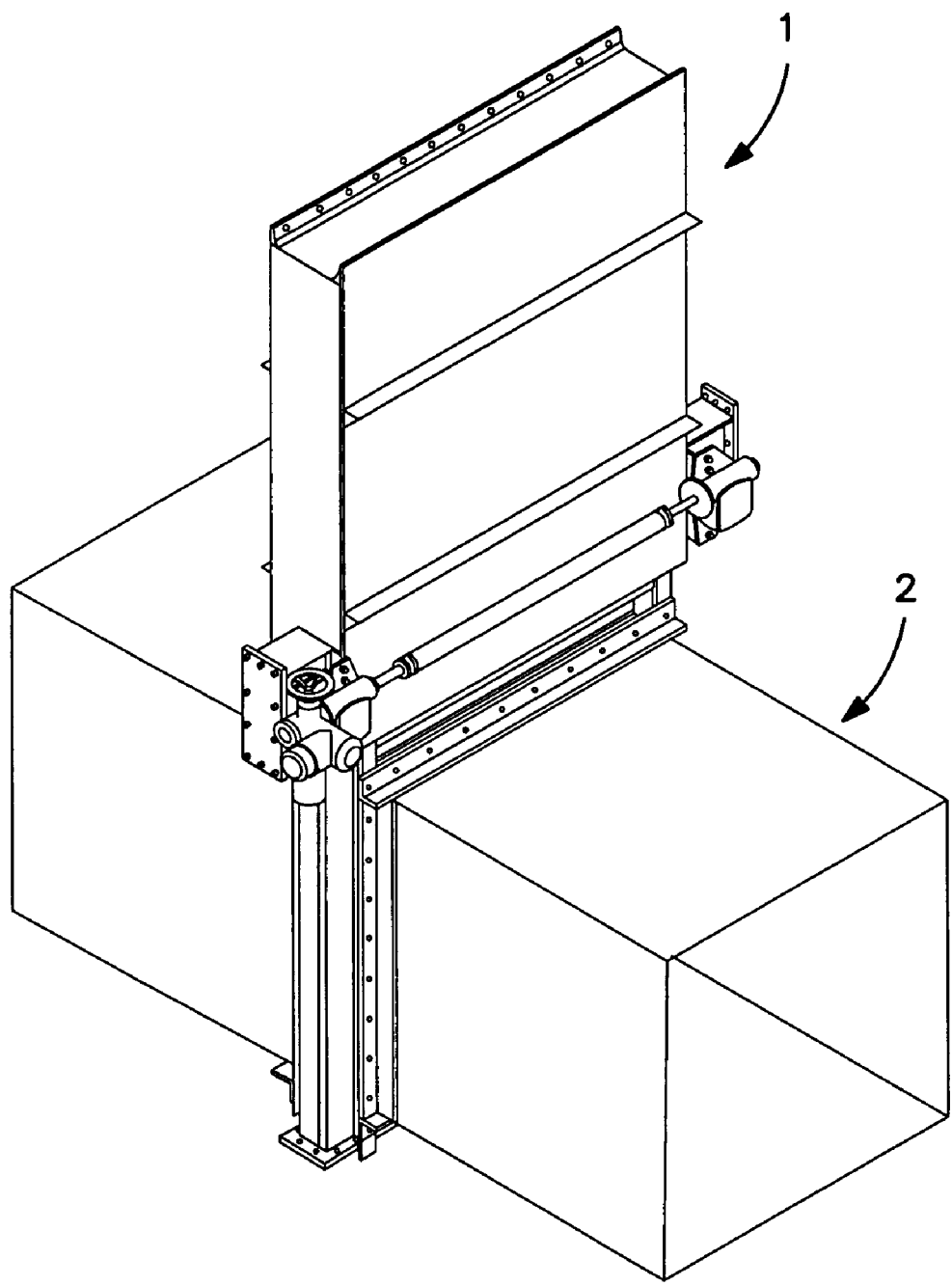
FIG. 1 is a perspective view of the damper of the present invention installed in an attached duct.
Figure 2:
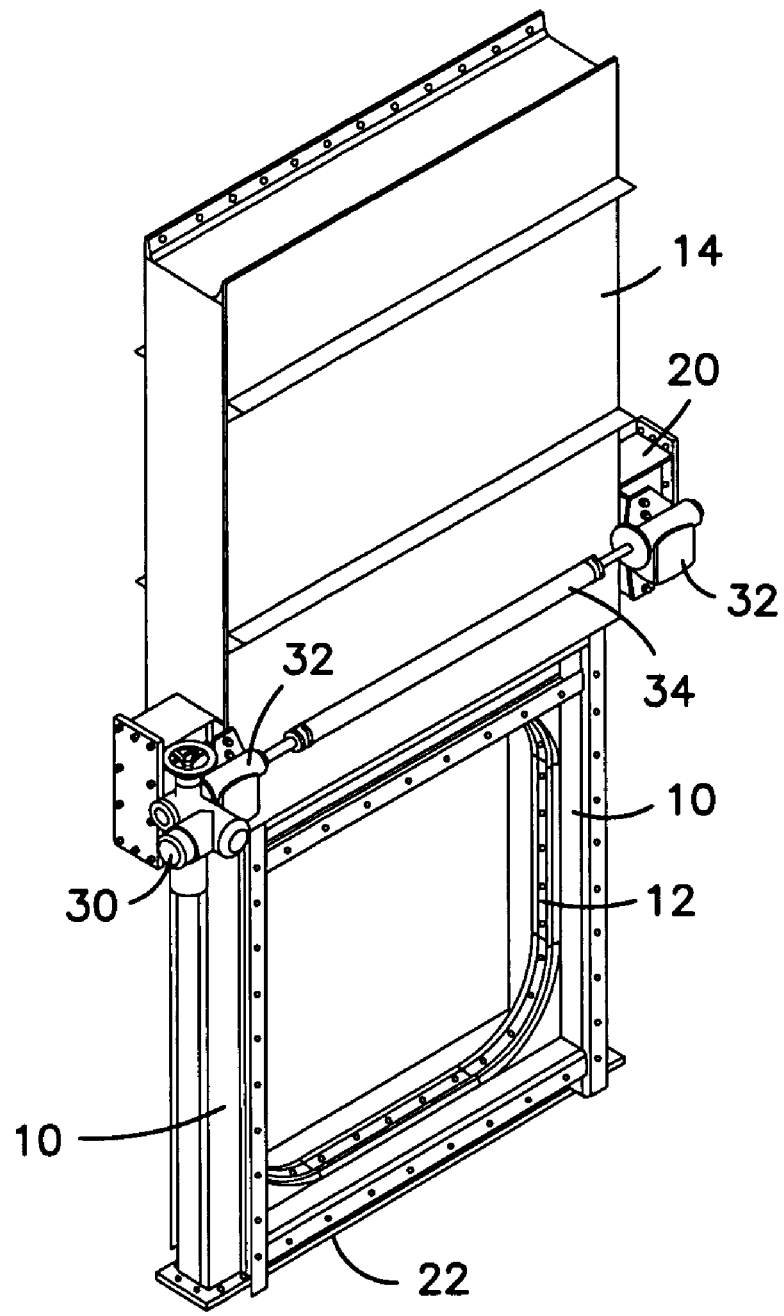
FIG. 2 is an isometric view of the damper of the present invention.
Figure 6:
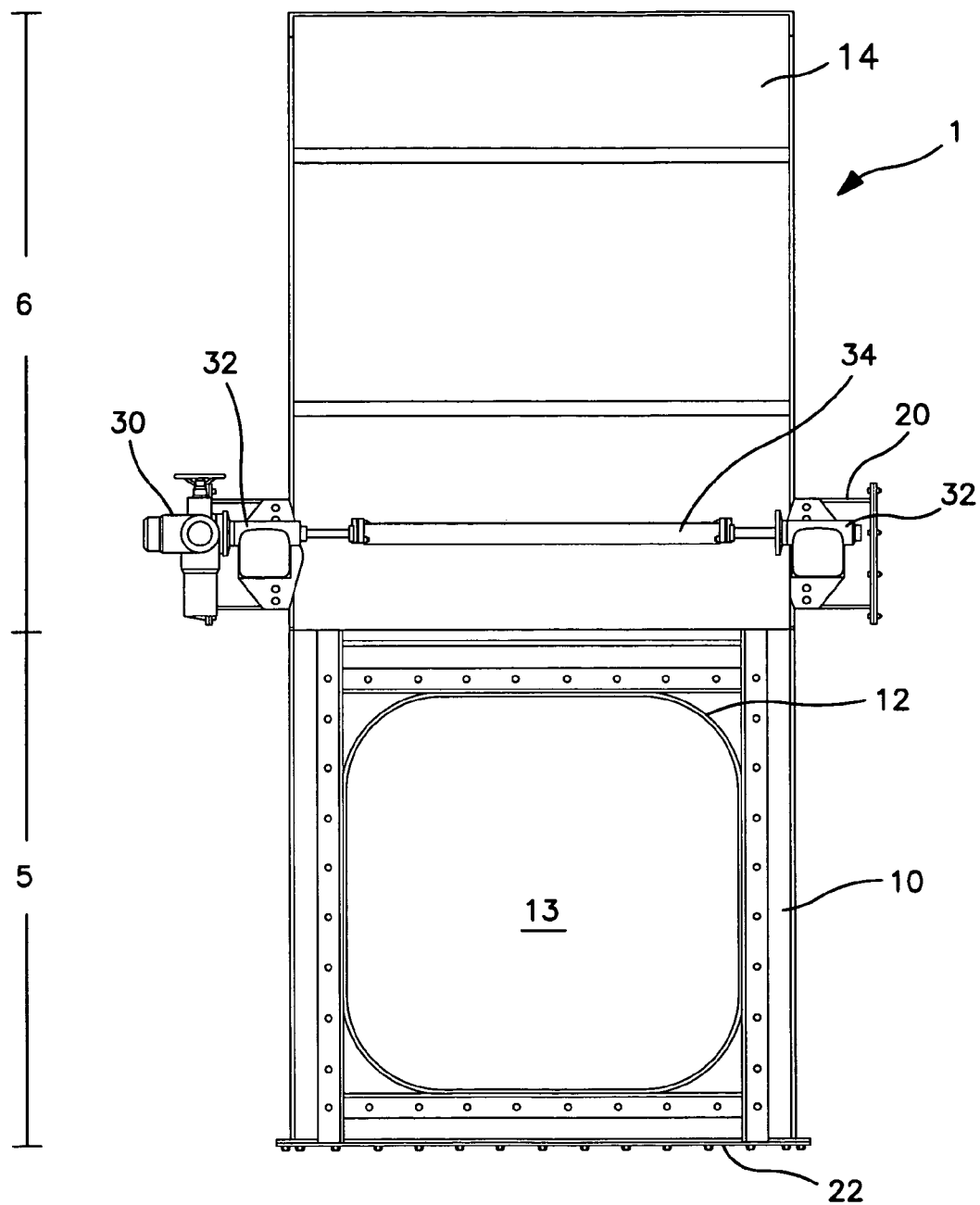
FIG. 6 is a front elevational view of the damper.
Figure 7:
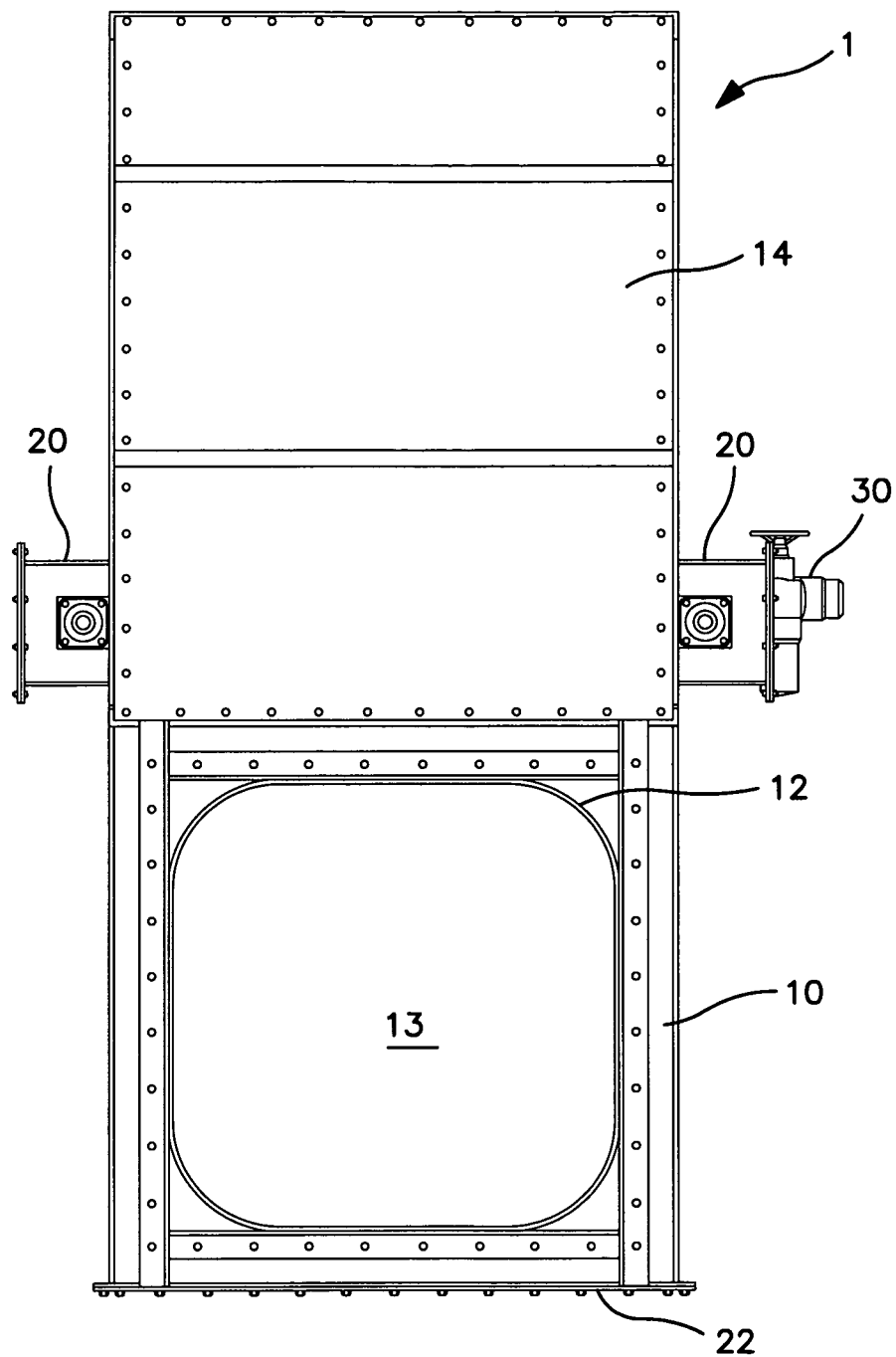
FIG. 7 is a rear elevational view of the damper.
Figure 8:
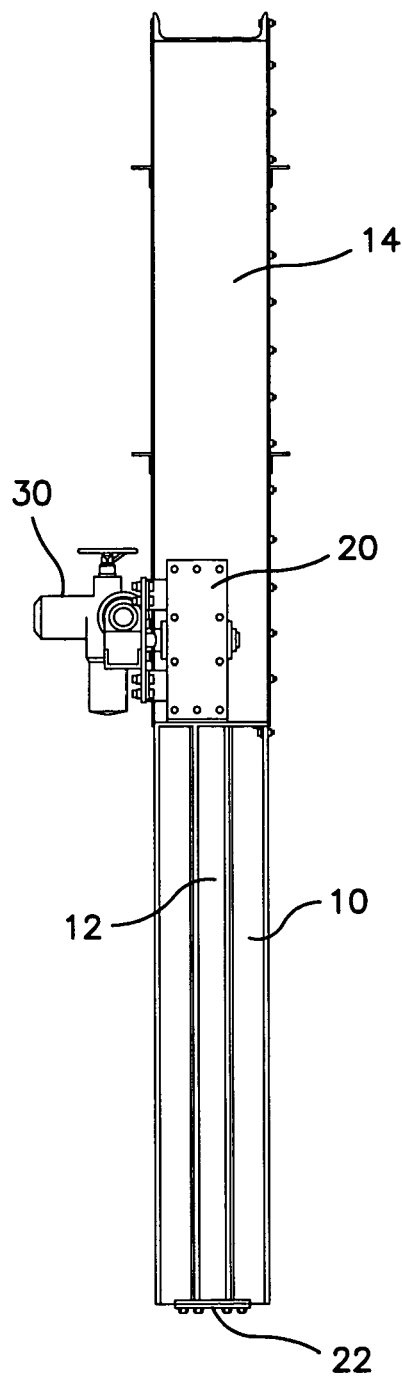
FIG. 8 is a right elevational view of the damper.

The damper 1 of the present invention is shown in detail in FIG. 2 and in situ installed in duct 2 in FIG. 1. Damper 1 consists essentially of frame 10, having a lower section 5, as shown in FIG. 6, disposed within the cross sectional area of attached duct 2, and an upper section 6, disposed adjacent to lower section 5 and outside of the cross sectional area of duct 2. In a normal installation, upper section 6 will be above lower section 5, but, in practice, there is no reason why upper section 6 cannot be disposed to the right, to the left, or below lower section 5. Frame 10 can be attached to duct 2 by any conventional means known in the prior art, such as through the use of bolts or folded flanges.

Figure 5:
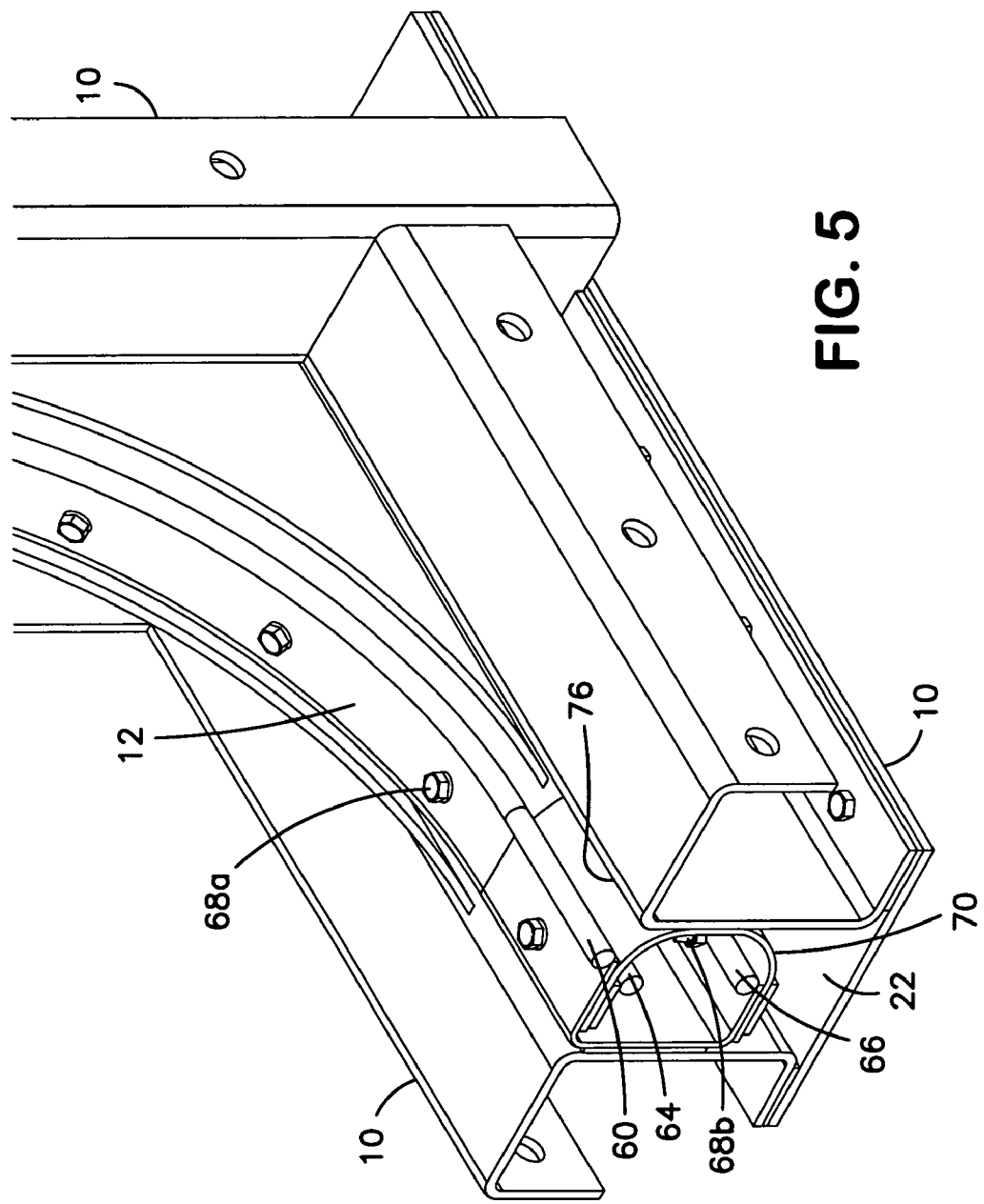
FIG. 5 is an isometric cut-away view of the seal cartridge installed in the frame.
Figure 9:
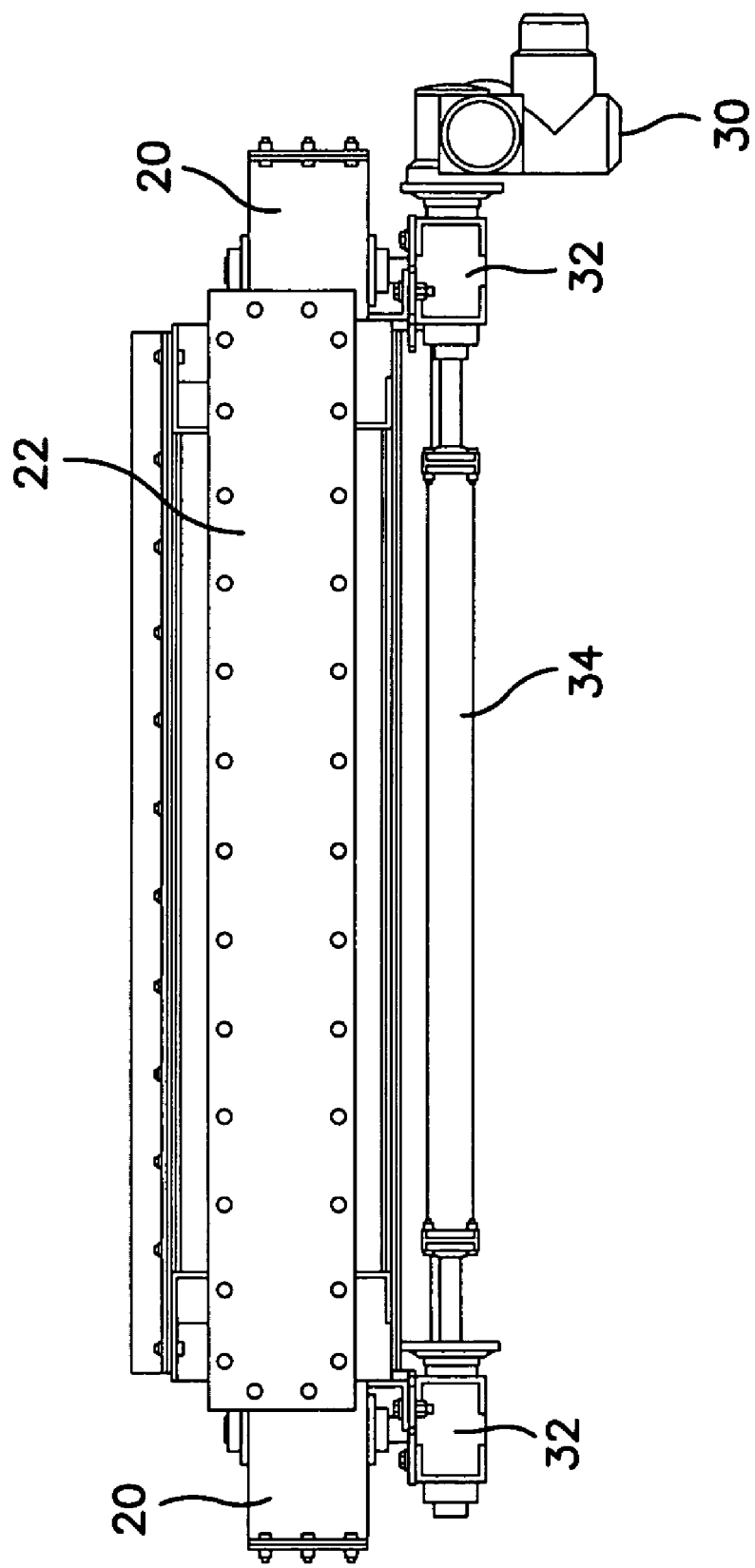
FIG. 9 is a bottom view of the damper.
Figure 10:
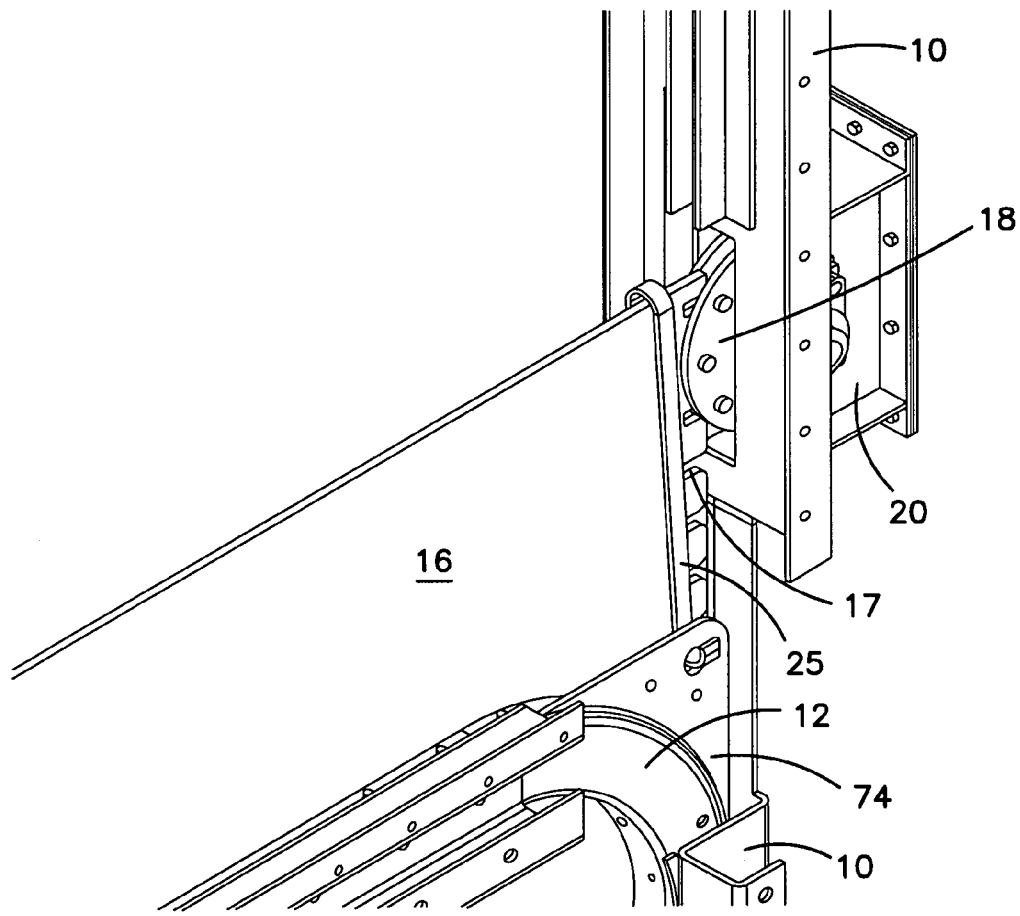
FIG. 10 is an isometric cut-away view of the accessory lifting mechanism for removing the seal cartridge from the frame.

Seal cartridge 12 is situated within lower portion 5 of frame 10, as shown in FIG. 5 and can be removed by opening seal access port 22, located at the lower extremity of frame 10, as shown in FIG. 9. Seal access port 22 allows seal cartridge 12 to be removed for maintenance and/or replacement. Seal cartridge 12 may also be removed for maintenance and/or replacement by use of a blade lift attachment 25, shown in FIG. 10, which allows blade plate 16 to lift seal cartridge 12 out of frame 10 when bonnet 14 is removed. Blade lift attachment 25 is hooked over blade plate 16 and attached to holes defined in ears 74, which are affixed to seal cartridge 12.

When in place, seal cartridge 12 is secured to frame 10 via a series of bolts extending through holes defined in the bottom of U-shaped flange 62 (not shown) which align with a corresponding series of holes defined in frame 10. The bolts are secured with nuts. Preferably, to reduce leaks of compressed air from air chamber 65, the nuts are welded to the inside of U-shaped flange 62 around the holes defined therein. Alternatively, seal cartridge 12 may be secured within frame 10 by one or more clamps (not shown).

When in position within lower portion 5 of frame 10, seal cartridge 12 provides an opening 13 through which material within attached duct 2 can flow when damper 1 is in the open position.

Upper portion 6 of frame 10 consists of enclosed bonnet 14 which will normally extend above and outside of attached duct 2. Bonnet 14 houses blade plate 16 when damper 1 is in the open position, as shown in cross sectional view in FIG. 14. Bonnet 14 is integral with lower portion 5 and thereby eliminates the need for additional seals between frame 10 and blade plate 16.

Figure 12:
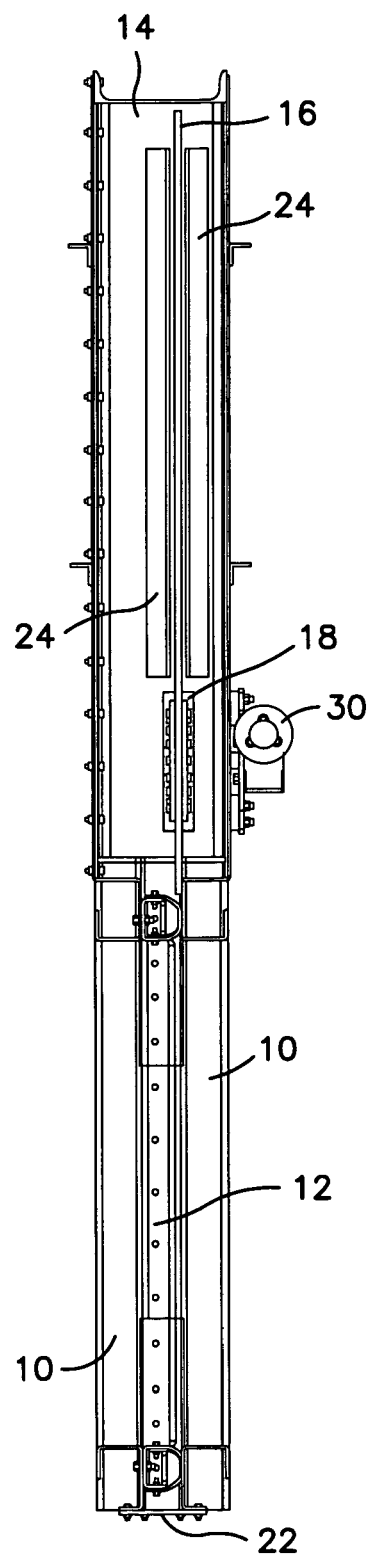
FIG. 12 is a side cross section view of the damper having the blade plate in the open position.
Figure 13:
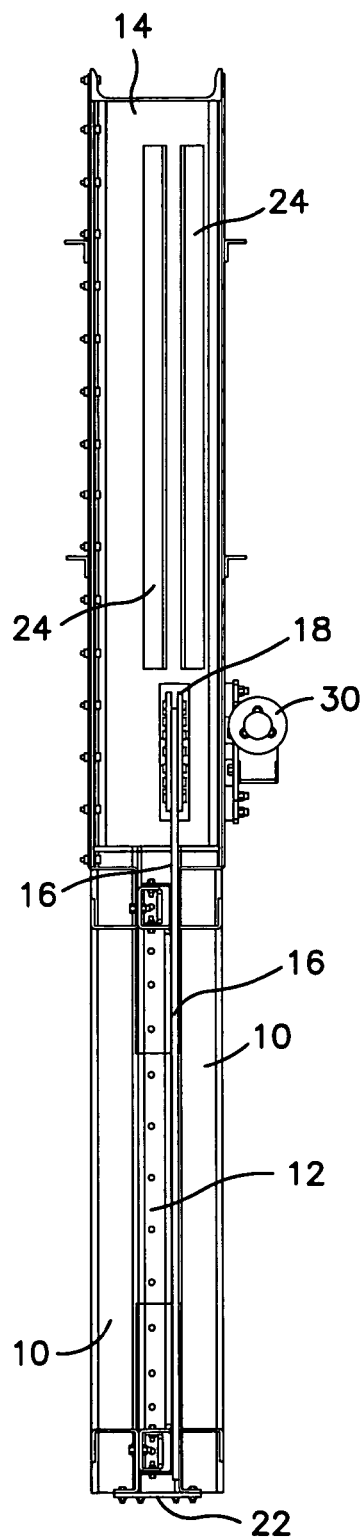
FIG. 13 is a side cross section view of the damper having the blade plate in the closed position.

When damper 1 is in the open position, as shown in the cross-sectional view in FIG. 13, blade plate 16 is disposed within bonnet 14, guided by frame members 24, and area 13 in lower portion 5 of frame 10 is free of obstruction. To close damper 1, blade plate 16 is translated into lower position 5 of frame 10, and is situated between frame 10 and seal cartridge, occupying space 76 as shown in FIG. 5, thereby obstructing the flow of material through opening 13. This is shown in a cross-section in FIG. 12. To provide an air-tight seal, seal membrane 70 is inflated with a compressed air to force it into contact with blade plate 16.

Blade plate 16 is configured with a linear rack of toothed openings 17 on opposing sides thereof, which engage pinion wheels 18 disposed on opposite sides of frame 10 and extending through bonnet 14. Pinion wheels 18 are housed in housings 20 which extend from the sides of bonnet 14. In some embodiments of the invention, only one side of blade 16 may have linear rack 17 defined thereon and only one pinion wheel 18. Such a configuration may be used, for example, where damper 1 is situated such that upper portion 6 of damper 1 extends from the side of duct 2 instead of from the top, and where the motion of blade plate 16 is horizontal as opposed to vertical.

Figure 3:
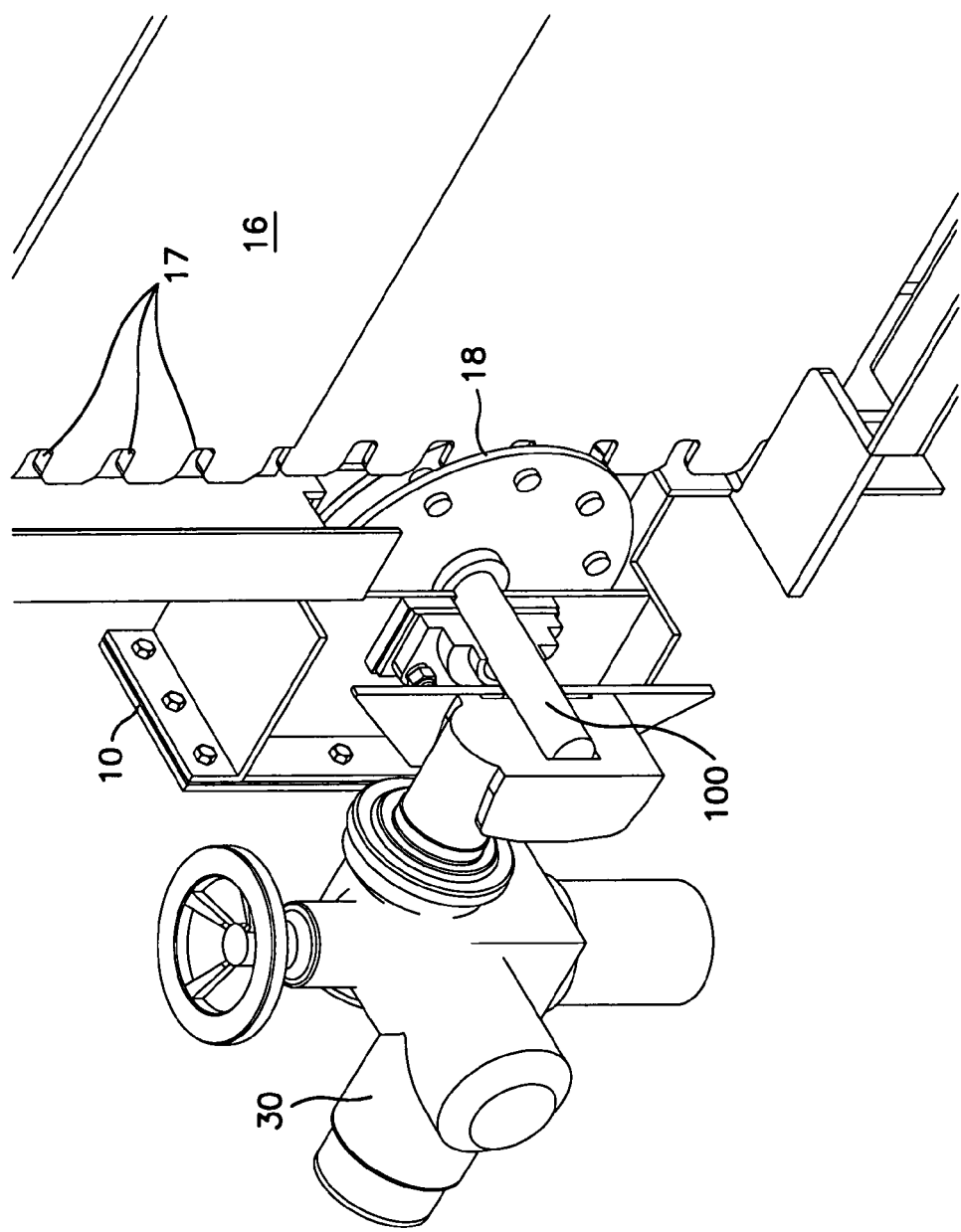
FIG. 3 shows a cut-away close-up view of the pinion wheel and motor assembly.
Figure 11A:
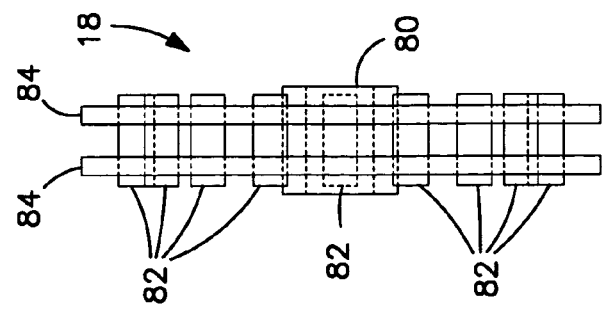
FIGS. 11a, 11b and 11c are side elevational, front elevational and isometric views respectively of the pinion wheel construction.
Figure 11B:
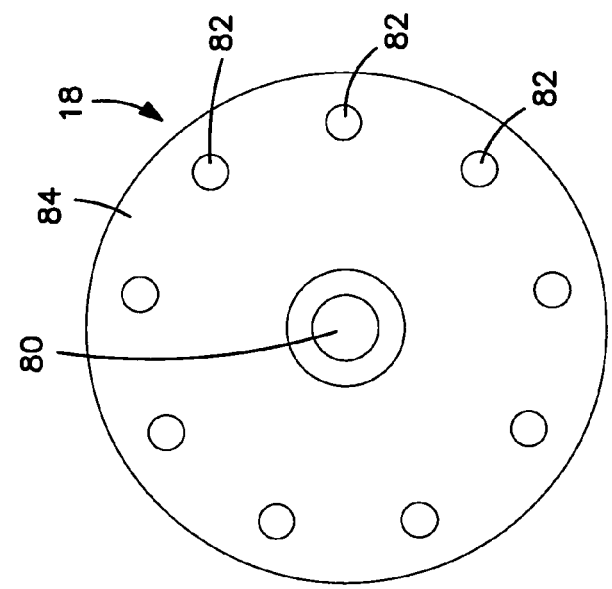
Figure 11C:
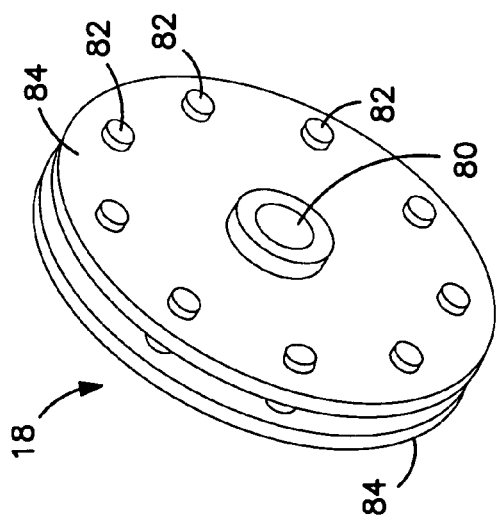

Pinion wheels 18 are shown in FIGS. 11a-c, and consist of pinion wheel sides 84 attached radially with pinion wheel hub 80, through which shaft 100 passes, and which, in turn, is eventually driven by motor 30 (see FIG. 3). A plurality of pinion pins 82 are disposed between pinion wheel sides 84 at a point between pinion wheel hub 80 and the outer radius of pinion wheel sides 84, and are held in place thereby. The actual number, size and spacing of pinion pins 82 may be varied without departing from the spirit of the invention, and is dependent upon, among other factors, the size and weight of blade plate 16. The spacing, size and frequency of slots 17 in the linear racks located along the sides of blade plate 16 must, of course, correspond with the frequency, size and shape of pinion pins 82 in pinion wheels 18. Additionally, hub 80 may be optional; pinion wheel sides 84 may be attached directly to the shaft of a motor or geared drive.

Rack 17 on each edge of blade plate 16 are cut of such a shape and dimension such that thermal expansion of blade plate 16 is accommodated. Pinion wheels 18 on either side of blade plate 16 counter rotate with respect to each other, thereby allowing blade plate 16 to move upward into bonnet 14 or downward into lower section 5 of frame 10. The movement of blade plate 16 is guided by blade guide 24 and also by pinion wheel sides 84, as shown in the cut-away view of FIG. 3.

Pinion wheels 18 are driven in counter rotating directions in the preferred embodiment by motor 30, which is linked to drives 32. Drives 32 for respective pinion wheels on the left and right side of damper 1 are connected by connecting rod 34, and, optionally, by flexible joints (not shown) located between drives 32 and connecting rod 34. Therefore, the motion of pinion wheels 18 is mechanically synchronized to insure that both sides of blade plate 16 are raised and lowered simultaneously. Alternate methods of rotating pinion wheels 18, such as the use of varying number of motors and varying configurations of linkages are contemplated to be with the scope of this invention.

The engagement between pinion pins 82 and linear racks 17 is virtually maintenance free. The use of pinion pins 82 represents an improvement over the prior art pinion gears in that solid matter and the effects of corrosion do not deteriorate the performance of the drive over time.

Figure 4:
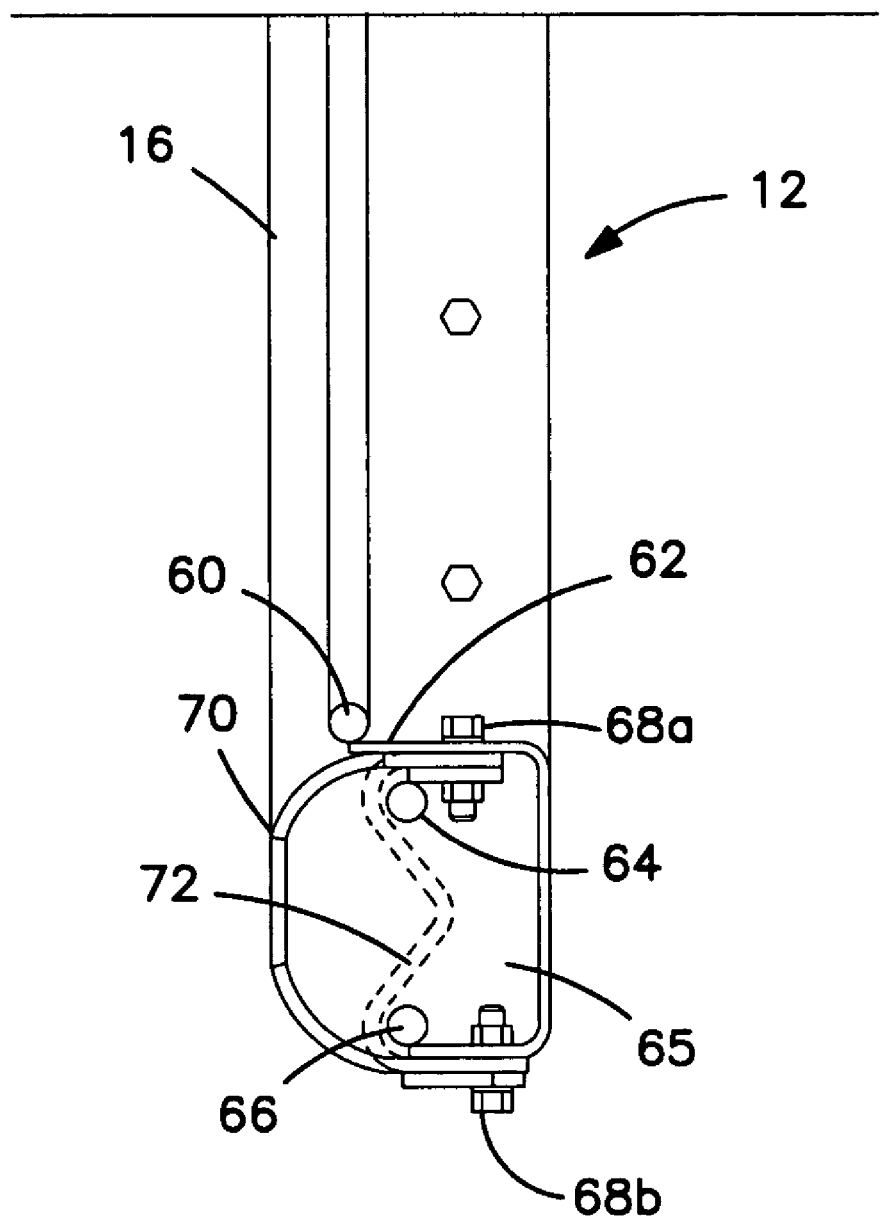
FIG. 4 is a side sectional view of the seal cartridge.

Seal cartridge 12 is shown in detail in FIGS. 4 and 5 and consists primarily of frame 10 upon which is mounted seal membrane 70. Seal membrane 70 is composed, in the preferred embodiment, of a reinforced fluoroelastic material with reinforcing fibers oriented radially about the center of the seal. Fluoroelastomers (FKM) used in the preferred embodiment of the invention are of the type manufactured in the United States by Dupont Dow Elastomers, L.L.C. of Wilmington, Del. under the trade name Viton® and by Dyneon, L.L.C of Oakdale, Minn. under the trade name Fluorel®. FKM is often used as expansion joints in ducts. Preferably, the corners of seal membrane 70 are shaped as a quarter circle having a radius essentially compatible with the overall seal proportions. The reinforcing fibers in the seal membrane may be stainless steel, nickel alloy, fiberglass, polyester, Kevlar® or any other high-strength material. In some instances, it may be preferable that the reinforcing material be a corrosion-resistant material.

Seal membrane 70 is attached to U-shaped flange 62 using bolts 68a and 68b as shown in the cross-sectional view of seal cartridge 12 in FIG. 4, thereby forming air chamber 65. Alternatively, welded studs may be used in place of bolts 68a and 68b to attach seal membrane 70 to U-shaped flange 62. Compressed air can be forced into air chamber 65 or evacuated from air chamber 65 via air valve 19 shown in FIG. 4. Seal membrane 70 is shown in its normal position in FIG. 4. This positioning of seal membrane 70 is assumed in the absence of negative air pressure within air chamber 65, that is, when compressed air is introduced into air chamber 65, or when there is a neutral air pressure in air chamber 65. As a result, the contact between seal membrane 70 and blade plate 16 will be maintained even in the event of a failure of the compressed air system, or in the event of a leak in air chamber 65. Reference number 72 in FIG. 4 shows the position of seal membrane 70 assumed when air chamber 65 is evacuated under negative air pressure. Position 72 of seal membrane 70 is assumed when blade plate 16 is translating from one position to another, to avoid contact between irregularities, rough surface areas or corrosion extant on blade plate 16 with seal membrane 70, thereby further prolonging the life of seal membrane 70.

Inner seal guide 64 and outer seal guide 66 prevent creasing of the fluorelastomer and therefore further prolongs the life of seal membrane 70. The offset position of bolts 68a, located on the inner surface of flange 62, and 68b, located on the outer surface of flange 62, with respect to each other force seal membrane 70 to assume its normal (non-evacuated) position even during a loss of air pressure within air chamber 65.

During the operation of damper 1, air chamber 65 is evacuated under negative air pressure through air valve 19 and seal membrane 70 is drawn into position 72 against inner and outer seal guides 64 and 66 respectively, to avoid contact with blade plate 16 as blade plate 16 translates into or out of bonnet section 14. If damper 1 is being closed, blade plate 16 moves into a position juxtaposed with seal cartridge 12 and in between seal cartridge 12 and frame 10, to occupy space 76 shown in FIG. 5. As blade 16 is translating into this position, seal membrane 70 is held against seal guides 64 and 66 by negative air pressure within air chamber 65 to prevent contact with blade plate 16.

Blade guide 60 is preferably welded to flange 62 and serves as a guide for blade plate 16 to ride along, further negating the possibility of contact between blade plate 16 and seal membrane 70. Preferably, blade guide 60 is composed of a hardened metal or a soft metal having a hardened metallic coating, such that blade guide 60 has a hardness greater than that of blade plate 16. When fully lowered into lower section 5, blade plate 16 rests between blade guide 60 and frame 10 of damper 1. When seal membrane 70 is inflated by the introduction of compressed air into air chamber 65, seal membrane 70 engages blade plate 16 to form a seal. At this point, blade plate 16 may be not necessarily be in contact with blade guide 60. Under normal operating conditions, i.e., when damper 1 is opened, air chamber 65 is either pressurized by compressed air within chamber 65 or by neutral air pressure within chamber 65. In either case, seal membrane 70 should assume its normal, non-evacuated position.

Figure 14:
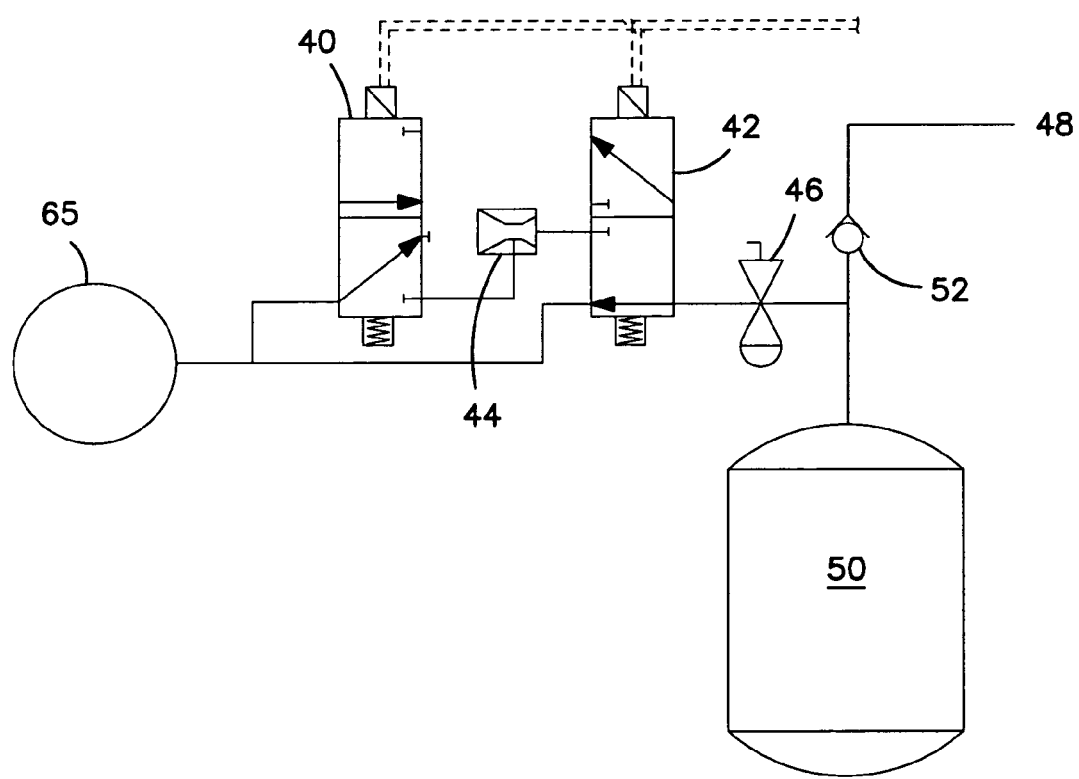
FIG. 14 is a schematic view of an exemplary system for inflating and deflating the air chamber of the seal cartridge.

FIG. 14 shows a schematic of a system used to inflate and evacuate air chamber 65 of seal cartridge 12. Air supply 48 provides pressurized air which is stored in accumulator 50 through check valve 52. Filter/regulator 46 filters the air of impurities and regulates the pressure. Seal air chamber 65 is inflated when three-way valve 42 is de-energized. To evacuate air chamber 65, valve 42 is energized and air flow through ejector 44 causes air from air chamber 65 to be withdrawn. Note that the system shown in FIG. 12 is only illustrative of one possible system for manipulating seal membrane 70; many other configurations well known in the prior art may also be used.

The illustrations, materials, and dimensions used herein are exemplary in nature only and are not meant to limit the scope of the invention, which is embodied in the claims which follow.

The invention claimed is:

1. A rack and pinion system for opening and closing a damper comprising:
    a plate, having parallel opposing edges, at least one of said edges having a toothed rack defined thereon; and
    one or more pinion wheels, said pinion wheels having a plurality of pinion pins engaging said toothed rack, such that a rotation of said one or more pinion wheels results in the movement of said plate longitudinally, in two opposite directions, with respect to said pinion wheels, each of said pinion wheels having a center of rotation,
    wherein the toothed rack further comprises a series of teeth formed in at least one side of the plate, the teeth having opposing sides comprising respective tooth surfaces that co-operate with the pinion pins to impart movement of said plate longitudinally in two opposite directions, the opposing sides extending, at least in part, substantially parallel to one another and substantially perpendicular to each of said two opposite directions of movement of the plate,
    so that upon engagement of the one or more pinion wheels with the toothed rack, the one or more pinion wheels impart forces to the plate substantially exclusively in each direction of movement of the plate.

2. The rack and pinion system of claim 1, wherein each of said parallel opposing edges of said plate have toothed racks defined thereon and further having two pinion wheels, one pinion wheel disposed along each of said opposing edges of said plate.

3. The system of claim 1 further comprising one or more motors for rotating said one or more pinion wheels.

4. The system of claim 2 further comprising one or more motors for driving said pinion wheels in counter-rotating directions with respect to each other.

5. The system of claim 1 wherein each of said pinion wheels comprises: two wheel-shaped pinion wheel sides radially aligned in a parallel relationship with respect to each other; and a plurality of pinion pins, disposed between said wheel-shaped pinion wheel sides.

6. The system of claim 5 wherein said plurality of pinion pins are spaced evenly around a radius defined about said hub.

7. The system of claim 6 wherein said pinion pins are cylindrical in shape.

8. The system of claim 6 wherein said pinion pins are composed of a hardened metal.

9. The system of claim 6 wherein said plurality of pinion pins are inwardly offset from the outer edge of said pinion wheel sides, such that a portion of said pinion wheel sides overlap said plate when said pinion pins engage said toothed rack.

10. The system of claim 4 wherein said one or more motors comprises one motor and wherein said system further comprises: a first actuator, driven by said motor, coupled to one of said pinion wheels; a second actuator, coupled to the other of said pinion wheels; and a connecting rod, coupling said first actuator and said second actuators.

11. The system of claim 10 further comprising one or more flexible joints disposed between said connecting rod and said first and said second actuators.

12. The system of claim 10 wherein said actuators rotate said pinion wheels in opposite directions.

13. The system of claim 1 wherein said plate is composed of a metal and further wherein said toothed rack is cut directly into the metal of said plate.

14. In a damper for a duct having a frame mounted cross-sectionally in said duct, a plate that translates into and out of said duct to close and open said damper, and a seal cartridge mounted in said frame that engages with said blade plate when in the closed position to seal said duct, an improvement comprising:
   toothed racks defined on one or both opposing edges of said blade plate; and
   one or more pinion wheels, said pinion wheels having a plurality of pinion pins engaging said toothed racks, such that a rotation of said pinion wheels results in the longitudinal translation of said plate, in two opposite directions, into and out of said duct, each of said pinion wheels having a center of rotation,
   wherein the toothed rack further comprises a series of teeth formed in at least one side of the plate, the teeth having opposing sides comprising respective tooth surfaces that co-operate with the pinion pins to impart movement of said plate longitudinally in two opposite directions, the opposing sides extending, at least in part, substantially parallel to one another and substantially perpendicular to each of said two opposite directions of movement of the plate, so that upon engagement of the one or more pinion wheels with the toothed rack, the one or more pinion wheels impart forces to the plate substantially exclusively in each direction of movement of the plate.

15. The improvement of claim 14 wherein each of said parallel opposing edges of said plate have toothed racks defined thereon and further having two pinion wheels, one pinion wheel disposed along each of said opposing edges of said plate.

16. The improvement of claim 14 wherein said pinion wheels comprise:
   two wheel-shaped pinion wheel sides radially aligned in a parallel relationship with respect to each other; and a plurality of pinion pins, disposed between said wheel-shaped pinion wheel sides and spaced evenly about said hub.

17. The improvement of claim 14 further comprising one or more motors for rotating said pinion wheels.

18. The improvement of claim 16 further comprising one or more motors for counter-rotating said pinion wheels with respect to each other, said counter-rotation of said pinion wheels resulting in the movement of said plate longitudinally with respect to said pinion wheels.

19. The improvement of claim 18 wherein said one or more motors comprises one motor and wherein said system further comprises: a first actuator, driven by said motor, coupled to one of said pinion wheels; a second actuator, coupled to the other of said pinion wheels; and a connecting rod, coupling said first actuator and said second actuators.

20. The improvement of claim 14 is further comprising a hook, attachable between said blade plate and said seal cartridge, for lifting said seal cartridge out of said frame.

* * * * *